United States Patent [19]

Calamvokis et al.

[11] Patent Number: 5,557,610
[45] Date of Patent: Sep. 17, 1996

[54] CELL SWITCH FABRIC CHIP

[75] Inventors: Costas Calamvokis, Bishopston; David Banks, Redland, both of England

[73] Assignee: Hewlett-Packard Company, Palo Alto, Calif.

[21] Appl. No.: 422,141

[22] Filed: Apr. 14, 1995

[30] Foreign Application Priority Data

Apr. 28, 1994 [EP] European Pat. Off. .............. 94303118

[51] Int. Cl.$^6$ ................................. H04L 12/56
[52] U.S. Cl. ........................................ 370/60.1
[58] Field of Search ...................... 370/54, 58.1, 58.2, 370/58.3, 60, 60.1, 61, 94.1, 94.2, 99

[56] References Cited

U.S. PATENT DOCUMENTS

| | | | |
|---|---|---|---|
| 5,258,752 | 11/1993 | Fukaya et al. | 370/60 |
| 5,301,055 | 4/1994 | Bagchi et al. | 370/60.1 |
| 5,307,343 | 4/1994 | Bostica et al. | 370/60 |
| 5,327,420 | 7/1994 | Lyles | 370/60 |
| 5,369,635 | 11/1994 | Gandini et al. | 370/60.1 |

FOREIGN PATENT DOCUMENTS

| | | |
|---|---|---|
| 0338558 | 10/1989 | European Pat. Off. . |
| 0363053 | 4/1990 | European Pat. Off. . |

OTHER PUBLICATIONS

IEEE International Solid–State Circuits Conference, vol. 34, Feb. 1991, New York US, S. Tanaka et al. 'A 400 Mbit/s 8*8 BiCMOS ATM switch LSI with 128kB on–chip shared memory' pp. 242, 243, 321 *the whole document*.

International Conference On Communications, vol. 2, Jun. 1991 N.Y. USA pp. 711–715, T. Kozaki et al. '32*32 shared buffer type AM switch VLSIs for B–ISDN' *paragraph 3.1*.

Primary Examiner—Alpus H. Hsu

[57] ABSTRACT

A cell switch fabric chip is provided for use in different arrangements of fabric interfacing a cell body memory to N input ports and N output ports. Each port has a plurality of lines over which constituent bits of a cell body can be transferred by a succession of bit shifts. The chip includes M externally-accessible, separate memory buses each with an associated plurality S of shift register blocks. Each shift register block has an input shift register of L elements into which bits can be shifted from an input port line, the input shift register being connected to said input contact to enable bits to be shifted into the register, and an output shift register of L elements out of which bits can be shifted through an output port line. The input shift register can transfer its contents in a parallel transfer onto the associated bus and, similarly, the output shift register can be loaded by a parallel transfer from the bus. The chip can handle BM sets of port lines where B is the integer part of the result of the division S/N and where each set includes all corresponding lines taken one from each of the N input and N output ports. Thus, for example, if M=2 and S=8, the chip can be used for switch fabric arrangements with 1, 2, 4 or 8 ports to handle 16, 8, 4, or 2 sets of port lines.

15 Claims, 14 Drawing Sheets

PORT A = 51 Mb/s
PORT B = 100 Mb/s
PORT C = 155 Mb/s
PORT D = 155 Mb/s
PORT E = 155 Mb/s

☒ OUTPUT DATA
☒ INPUT DATA

T=0

T≃0.5

CELL SWITCH FABRIC CHIP

The present invention relates generally to a cell switch fabric chip and, in particular, to a chip usable in different arrangements of an ATM switch fabric.

ATM (Asynchronous Transfer Mode) is a multiplexing and switching technique for transferring data across a network using fixed sized cells that are synchronous in the sense that they appear strictly periodically on the physical medium. Each cell comprises a payload portion and a header, the latter including a label that associates the cell with an instance of communication between sending and receiving network end systems; this instance of communication may involve the transfer of many cells from the sending end system, possibly to multiple receiving end systems. ATM is asynchronous in the sense that cells belonging to the same instance of communication will not necessarily appear at periodic intervals.

In ATM, the labels appended to the cells are fixed-size context dependent labels, that is, they are only understandable in the light of context information already established at the interpreting network node, the label generally being replaced at one node by the label required for the next node. In other words, ATM is a virtual circuit technology requiring a set up phase for each instance of communication to establish the appropriate label knowledge at each node.

ATM technology is finding increasing popularity because it can offer an acceptable compromise in combining timeliness characteristics (normally associated with circuit switching technologies) and statistical advantage (associated with packet switching technologies). ATM holds out the prospect of a single transfer mode technology for carrying all traffic types, including voice, entertainment services, or computer traffic.

The present invention is applicable generally to ATM systems (as well as other cell switching systems) independently of specific implementation details such as cell size and reference to ATM in the accompanying claims should be accordingly interpreted. However, in the following description, particular reference will be made to the emerging B-ISDN ATM standards being evolved by the CCITT and the ATM Forum (the former being primarily concerned with public networks and the latter with computer-related user networks).

In fact, even within these emerging standards, the semantics of the information contained in the header portion of each cell varies depending on where in the network the cell appears (at its edge or internally), and the nature of the overlying ATM adaption layer which processes ATM cells in the network end systems. Unless specifically stated otherwise, in the following description the cell format under consideration is the B-ISDN UNI (User Network Interface) cell format for AAL5 services ("AAL" refers to the ATM Adaption Layer, AAL5 being a connection oriented, variable bit rate asynchronous communication service appropriate to computer communication).

FIG. 1 of the accompanying drawings shows the format of such a cell in a byte wide format. As can be seen, the cell is made up of a 5-byte header and a 48-byte payload of user data. The header fields are as follows:

| | | |
|---|---|---|
| GFC | 4 bits | General Flow Control Field; |
| VPI | 8 bits | Virtual Path Indicator field; |
| VCI | 16 bits | Virtual Channel Indicator field; |
| PT | 3 bits | Payload Type Field; |
| EOP | 1 bit | End of Packet Field; |
| HEC | 8 bits | Header Error Check Field; |

The VPI and VCI together form the virtual circuit label for the cell on a particular link and this label forms the basis on which the cell is routed at the next network node it encounters. Generally, in ATM parlance, a virtual circuit is called a "Virtual Channel" and the VPI fields can be thought of as identifying a group of virtual channels on a link whilst the VCI identifies a particular virtual channel in that group.

The EOP bit is used to indicate that the cell is the last cell of a sequence of cells that together make up a higher level application data unit (packet). The advantage of giving this end of packet information visibility in the cell header, is that it enables all the cells making up a packet to be discarded if one constituent cell is lost.

An ATM cell arriving at a network node through one port will be re-routed (or switched) according to the VPI and VCI information stored in the cell header and the context information established in the node at set up time. The VPI and VCI information will be changed and the cell output. Such a node is generally referred to as an ATM switch 10 (see FIG. 2) and conceptually comprises a switch core 200 that is responsible for carrying out the following operations on the cells it handles:

— determining which cell belongs to which channel;

— deciding what channel a cell is destined for and routing it there; and,

— arbitrating among demands for access to the appropriate output port.

The switch will also include some sort of a processor unit 201 for looking after channel set up and any management functions, and interface circuitry 202 for interfacing the switch core to the links 203 connected by the switch, these links connecting to respective external ports of the switch.

The switch core will generally include circuitry enabling the appropriate routing of cells between input and output ports of the switch core, possibly via a common cell-body memory. Such circuitry is referred to as the switch fabric.

The present invention is concerned with providing a form of integrated circuit chip that can be used to implement a variety of different switch fabric arrangements.

SUMMARY OF THE INVENTION

According to one aspect of the present invention, there is provided a chip for use in implementing a cell switch fabric intended to interface a cell body memory to N input ports and N output ports where each port has a plurality W of lines over which constituent bits of a cell body can be transferred by a succession of bit shifts; the chip comprising M externally-accessible, separate memory buses each with an associated plurality S of single line-SR blocks, each block comprising:

— an externally-accessible input contact,

— an input shift register of L elements, the input shift register being connected to the input contact to enable bits to be shifted into the register, — an externally-accessible output contact, and — an output shift register of L elements, the elements of the register being connected to the output contact to enable bits to be shifted out of the register through the output contact, the or each memory bus further having associated parallel transfer means operative for each input register to transfer bits in parallel from the register onto the memory bus and for each output register to transfer bits in parallel from the memory bus into the register, the chip further comprising clocking and control means connected to the single line-SR blocks and to the parallel transfer means for clocking and controlling the shifting and parallel transfer of bits; the chip being usable in a plurality of different switch fabric arrangements to handle BM sets of lines where B is the integer part of the result of the division S/N and where each set comprises all corresponding lines taken one from each of said N input and N output ports.

The parallel transfer means may simply comprise a respective parallel connection associated with each input and output shift register, each such connection serving to selectively connect the elements of the associated register in parallel to the corresponding memory bus. However, advantageously the parallel transfer means comprises for each said block, a further register of L elements connected for the parallel transfer of bits from the input shift register into the further register and for the parallel transfer of bits from the further register to the output register, the further registers of all the blocks associated with the same memory bus being connected into a cascade arrangement for the parallel transfer of bits therethrough, the first of the further registers in the cascade arrangement being connected to receive bits in parallel from the memory bus and the last of the further registers in the cascade arrangement being connected for parallel transfer of bits onto the memory bus. In this case, the clocking and control means is arranged to cause:

— the transfer of bits from each input register associated with the memory bus into the corresponding further register and then the shifting of the contents of each further register through the cascade arrangement of further registers out onto the memory bus; and — the filling of the further registers with bits from the memory bus by successive parallel transfers from the bus into said first further register and the shifting of the contents of the latter through the cascade arrangement, the further registers when filled from the memory bus having their contents transferred in parallel to the corresponding output registers.

In one preferred embodiment of the invention, M=2 and S=8; in this case, the chip is usable in switch fabric arrangements with 1, 2, 4 or 8 ports to handle 16, 8, 4, or 2 sets of lines.

Advantageously, each single line-SR block includes further shift register elements for header bits of a header associated with each cell body.

The present invention further encompasses a cell switch fabric comprising C chips of the above form where C is the nearest integer number equal to or greater than W/BM, the lines of each said set of lines being connected to respective single line SR-blocks associated with the same memory bus. Thus, for example, M=2, S=8, and N=4, and the or each chip is connected to deal with four sets of lines; in the case where the cells being handled are ATM cells having 48-byte cell bodies, W may have a value of 16 (so that L a value of 24) resulting in four chips being used for the fabric.

Where the chips each have two (or more) memory buses, these buses can be externally interconnected whereby to effectively produce one memory bus for the value of M, the value of S being effectively multiplied up by the original number of buses thereby enabling the number of ports handled by the chip to be increased at the expense of decreasing the number of sets of lines that can be handled per chip.

Advantageously, transfer control means are provided for causing the shift registers of a chip that are connected to lines of the same port, to effect said parallel transfers with the associated memory bus directly one after another. These transfer control means can be formed in part by the clocking and control means of each chip, the clocking and control means being arranging to control the shift registers to effect parallel transfers with the associated bus according to a fixed rota; in this case, the transfer control means would further comprise the connection arrangement of the lines to the input/output contacts of the chips, this connection arrangement being such that corresponding lines from the ports are connected to shift registers that follow one another in rota. In an alternative form of the transfer control means, these means are wholly constituted by the clocking and control means of each chip, each clocking and control means including means for specifying the order in which the shift registers of the chip are to effect parallel transfers with the associated bus.

According to another aspect of the present invention, there is provided a cell switch fabric for interfacing a cell body memory to N input ports and N output ports where each port has a plurality W of lines over which the constituent bits of a cell body can be transferred by a succession of L bit shifts, the switch fabric comprising a plurality of chips each handling B sets of lines where each set comprises all corresponding lines taken one from each of the N input and N output ports, there being W/B such chips in all; each chip comprising M externally-accessible, separate memory buses each with an associated plurality BN/M of single line-SR blocks, each block comprising:

— an externally-accessible input contact,

— an input shift register of L elements, the input shift register being connected to the input contact to enable bits to be shifted into the register, — an externally-accessible output contact, and — an output shift register of L elements, the elements of the register being connected to the output contact to enable bits to be shifted out of the register through the output contact, each memory bus further having associated parallel transfer means operative for each input register to transfer bits in parallel from the register onto the memory bus and for each output register to transfer bits in parallel from the memory bus into the register, and the single line-SR blocks associated with the or each memory bus handling B/M sets of lines; the chip further comprising clocking and control means connected to said single line-SR blocks for clocking and controlling the shifting and parallel transfer of bits.

BRIEF DESCRIPTION OF THE DRAWINGS

An ATM switch embodying the invention will now be particularly described, by way of non-limiting example, with reference to the accompanying diagrammatic drawings in which.

BEST MODE FOR CARRYING OUT THE INVENTION

Architectural Overview

The ATM switch to be described hereinafter has a high-bandwith, N-port, switch core to which low-speed links are interfaced via multiplexer/demultiplexer units associated with respective switch core ports. The switch core services its ports cyclically to take in new cells for processing one at a time; there are thus two levels of multiplexing/de-multi-plexing embodied in the architecture (except, of course, when N=1).

Figure 1:
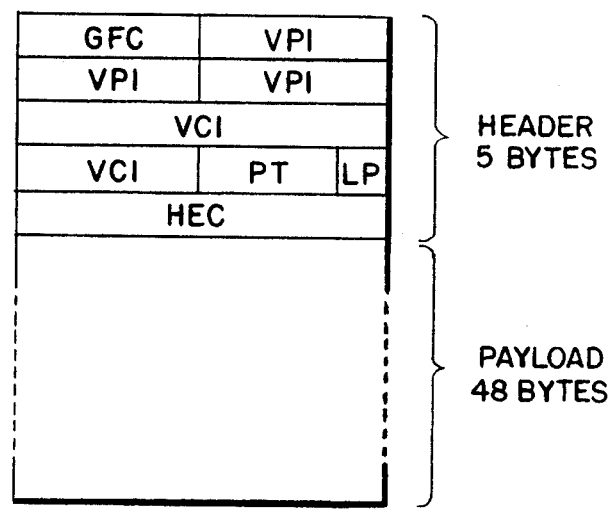
— FIG. 1 is a diagram of the format of a standard ATM UNI cell for an AAL5 connection, this Figure constituting prior an and having already been discussed above.
Figure 2:
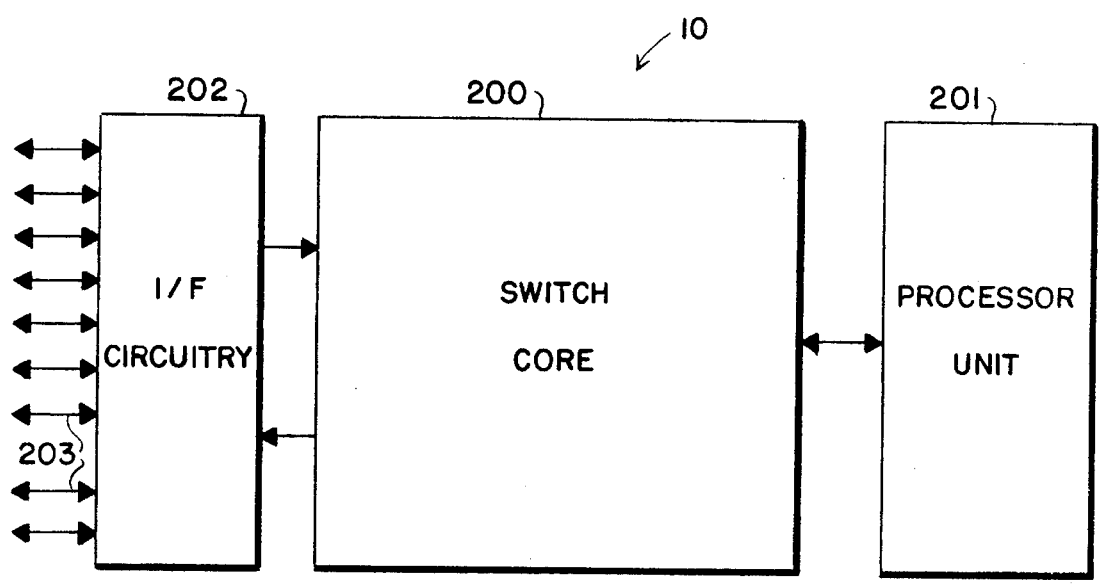
— FIG. 2 is a diagram of a general ATM switch architecture in which low speed links are first multiplexed together before being fed to a port of the ATM switch core, this general architecture being known and having been already discussed above.
Figure 3:
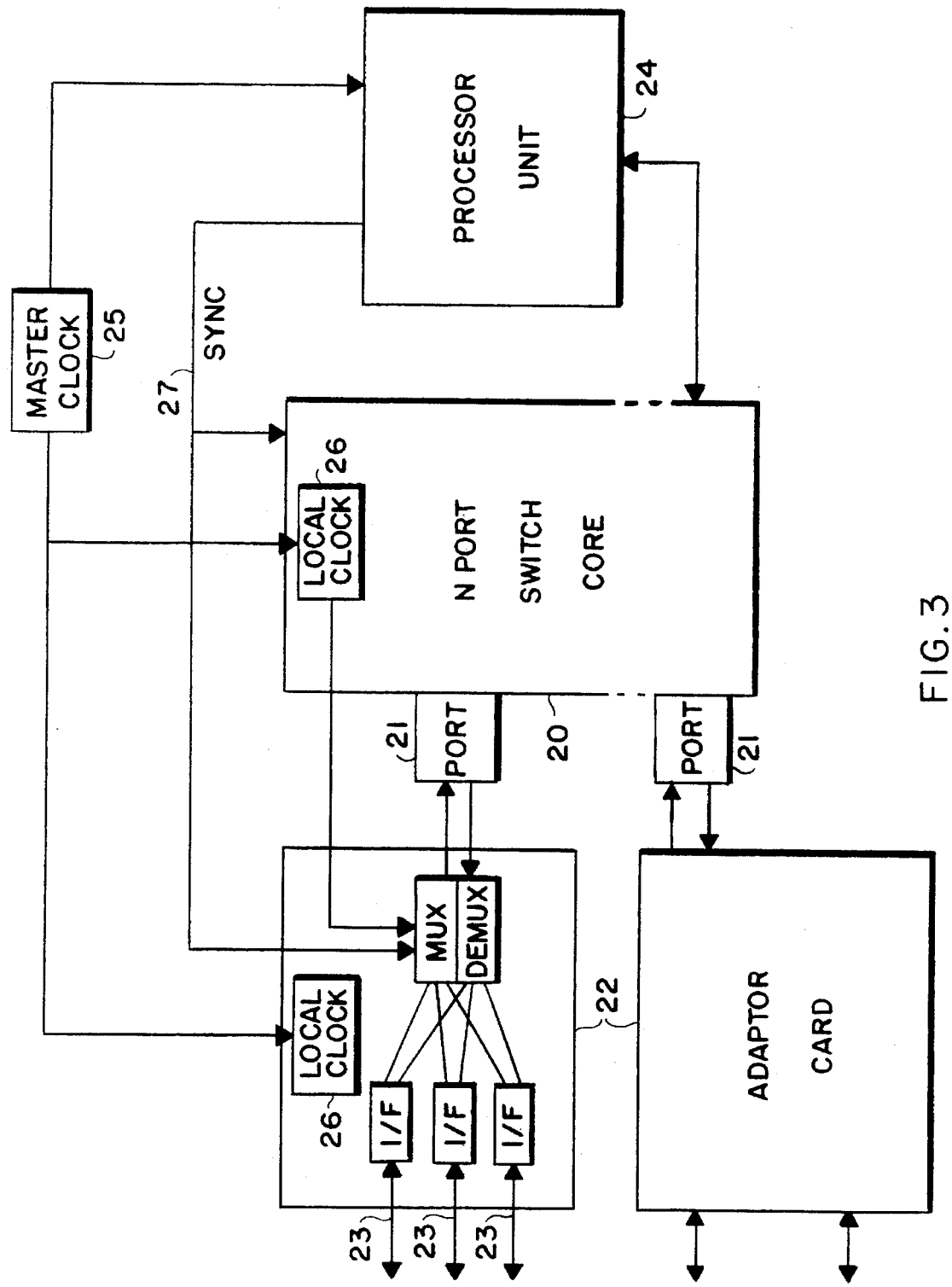
— FIG. 3 is a top-level diagram of the ATM switch embodying the invention.

Referring more specifically to FIG. 3, at the top level the switch embodying the invention can be thought of as consisting of three main types of blocks. At the centre there is the N-port switch core 20, each switch core port 21 operating at the same predetermined speed of, for example, 622 Mb/s. Attached to each of the ports 21 is an adapter card 22. Each adapter card 22 interfaces a number of lower speed external switch ports 23 to a switch core port. Finally there is the processor board 24, which performs the signalling and virtual channel setup functions.

To give specivity to the switch description, the switch core ports are taken as operating at 622 Mb/s; however, it will be appreciated that this port speed is not critical to the present invention, higher and lower speeds being possible.

The architecture of the switch is a "shared everything" architecture. This means that there are no substantial resources dedicated to any particular port and buffering and intelligence are centralized. Thus the Adapter Cards contain almost no buffering and intelligence.

A common master clock 25 feeds clock signals to all three main switch blocks (switch core 20, adaptor cards 22, processor 24) and local slave-clock units 26 generate appropriate local clock signals; this arrangement ensures that the clock speeds have a constant predetermined relationship. A line 27 provides a global synchronising signal from the processor block 24 to the switch core 20 and adaptor cards 22 to synchronise operation of the blocks at start up.

The following three subsections describe each of the three above referred to main blocks in more detail.

N-Port Switch Core 20

Figure 4:
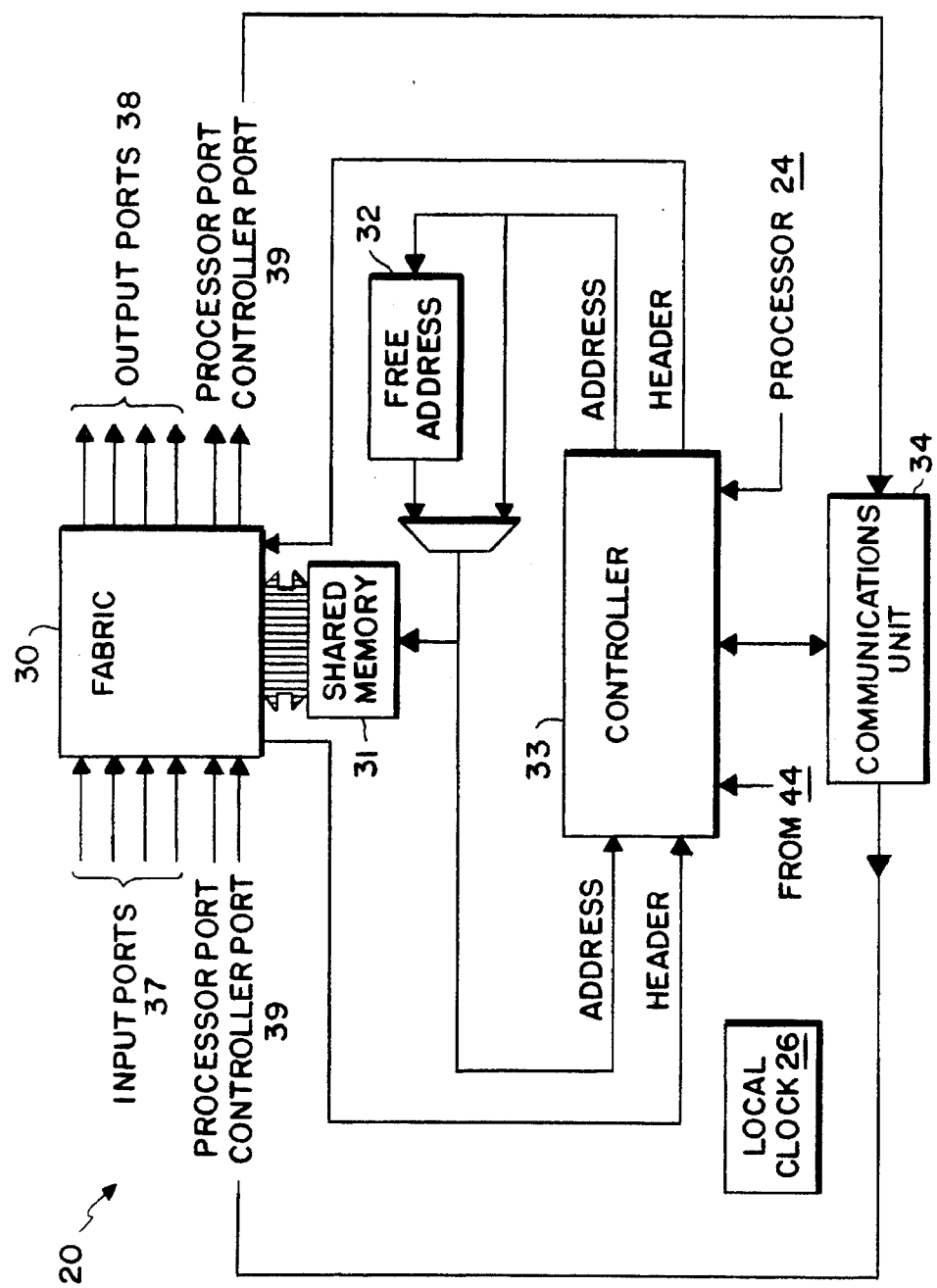
— FIG. 4 is a block diagram of a switch core block of the FIG. 3 switch.

A block diagram of the N-port Switch Core 20 is shown in FIG. 4 and, as can be seen, the switch core comprises a switch fabric 30 with input and output ports 37, 38 which are generally paired and as such constitute the switch core ports, a shared cell-body memory 31, a free address list memory 32, a controller 33, and a communications block 34 for carrying out ATM adaption layer and other higher communication layers processing of cells intended for/coming from the controller (thereby enabling the latter to communicate over the network of which the switch forms a part).

At this level of abstraction, operation of the switch core is very simple. The N input ports 37 are serviced in strict order one cell at a time. When a cell comes in on one of the input ports the Fabric 30 writes the cell body into the Shared Cell Body Memory 31 at an address taken from the free address list memory 32. This address is also passed to the Controller 33, along with the header of the cell to which it relates. Because the input ports 37 are serviced in a fixed order, the Controller 33 can tell the source of the cell from the arrival time of the header.

The controller 33 stores and processes the headers and cell body addresses of incoming cells. It also makes decisions about which cell to send next on each output port 38. To send a cell the controller outputs the cell's header and the address at which the cell's body is stored. The fabric 30 reads the cell body out of the Shared Cell Body Memory 31, combines it with the header and sends the cell on an output port. As the output ports are also serviced in a fixed order, the destination of the cell is determined by the time at which the controller sends the header and address. As well as the main switch core ports (input/output port pairs 37,38) to which Adapter Cards 22 attach, the Fabric 30 also supports two slower ports. One of these ports 39 is used by the processor 24 to send and receive cells, the other is used by the controller to send and receive flow control cells via the unit 34.

The bandwidth of the Shared Cell Body Memory 31 and the Controller 33 is sufficient to accommodate receiving cells from all the input ports 37 and sending cells to all the output ports 38 at the maximum rate of these ports. The clocking of the constituent elements of the switch core 20 is controlled by the local clock unit 26.

Considering the timing of switch core operation in more detail, if the period between successive cell arrivals at the given main switch core port speed (622 Mb/s) is T, then for an N-port switch core, the fabric 30 must be capable of receiving N cells in each period T, that is, one cell from each main switch core input port 37. Similarly, the fabric must be capable of sending N cells in period T, that is, one cell for each output port 38. The fabric 30 must also be able to handle the transfer of cells through the processor and controller ports.

As will be more fully explained below, the fabric basically comprises a plurality of shift registers into and out of which cells are transferred, by shifting, through the main switch ports, these transfers going on at the same time for all ports; the transfer of cell body data between the shift registers of the fabric 30 and the shared memory 31 and of the cell headers to/from the controller 33 is then done by parallel transfer from/to the shift registers according to a predetermined cycle of transfers that deal with each port in turn.

The general process involved for each cell transferred in through a switch core port is thus that the cell header is first shifted into the fabric followed by the cell body; whilst the cell body is being shifted in, the cell header is transferred out to the controller and then during the subsequent transfer of the cell body to the memory 31, the header of the next cell for the port concerned is shifted into the fabric. As similar but opposite process is followed to output a cell.

So far as the transfers to the cell body memory 31 are concerned, the transfer cycle simply goes round each main switch port in turn (for example, if there are four input ports 37 and four output ports 38, the transfer cycle might first service each input port in turn transferring cell body data to the memory 31, and then service each output port in turn, transferring data from the memory 31 to the fabric). The transfer of cell body data between the memory 31 and the shift registers associated with the controller and processor ports is handled by the fabric in predetermined redundant portions of the cell transfer cycle for the main switch core ports.

Figure 5:
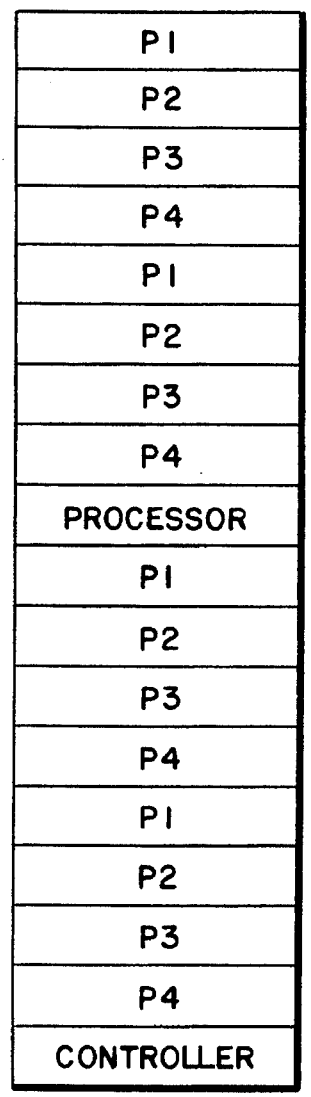
— FIG. 5 is a table depicting a service rota for the switch core ports.
Figure 5:
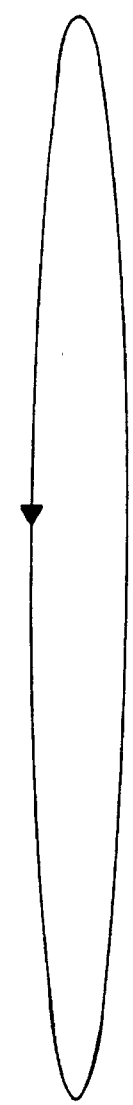

The transfer of cell headers between the fabric 30 and the controller 33 may follow a similar transfer cycle as for the cell body transfers provided that the controller 33 receives and can output headers sequentially (the controller effecting its processing sequentially). Thus, the controller and processor ports must be allocated their own slots in an overall port service cycle followed by the controller. Of course, the controller and processor ports are not serviced as frequently as the main switch core ports and generally, if the processor and controller ports run at $1/n^{th}$ of the speed of the main ports, then the processor and controller ports will be serviced only once every n services of the main ports. The result is an overall port service cycle such as illustrated in FIG. 5 for a switch core having four main ports P1 to P4, this cycle applying both to the input of headers to the controller 33 and to the output of headers from the controller (in fact, the cycles need not be the same for input and output, but generally this will be the case).

The cell headers passed to the controller 33 are associated with their corresponding cell bodies by the addresses that are used to store the cell bodies in the memory 31, these addresses being stored with the header data in the controller 33. It will be appreciated that the address at which a cell body is stored must be supplied to the controller 33 at a timing appropriate to ensure it is stored with the correct header.

As is explained hereinafter, certain of the cells supplied through the main switch core ports may be empty cells (or, more precisely, cells that are to be ignored), this condition being indicated by the values of VPI and VCI being set to zero in the cell header. The presence of such a cell does not alter the process of transferring the cell body to the memory 31 or cell header to the controller 33; however, upon the controller 33 finding that the VPI and VCI of the cell header are zero, it simply passes the associated address at which the cell body has been stored, back to the free address list 32, it being unnecessary to take any action in the memory 31 itself.

Adapter Card 22

Each Adapter Card combines a number of external input/output port pairs into one switch core port. The external input/output ports on one Adapter card may consist of any combination of links provided the bandwidth of these links sums to less than the switch core port speed. For instance, if the switch core port speed is 622 Mb/s, an Adapter card might contain twelve 51 Mb/s ports, or four 155 Mb/s ports or a mixture of speeds such as three 155 Mb/s, one 100 Mb/s and one 51 Mb/s port.

The Adapter Card's operation is very simple. For the most part it does not look at the cells it handles. One exception to this is the Header Error Check (HEC) field of each cell, which is generated by the Adapter Card for cells going out and checked by the Adapter Card for cells coming in. If the HEC fails for an incoming cell then the Adapter Card turns the cell into an empty cell by setting the VPI and VCI fields of the cell to zero.

Figure 6:
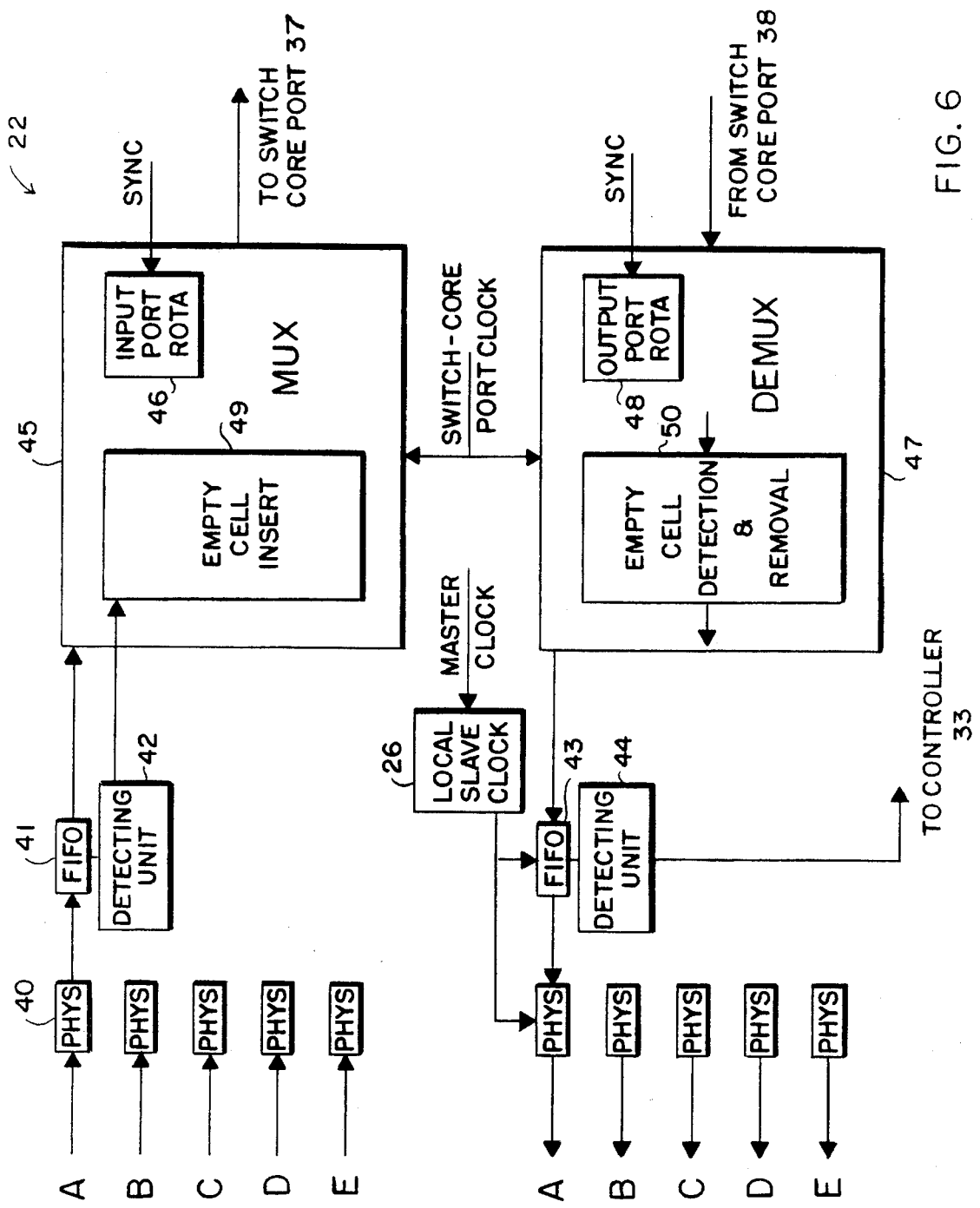
— FIG. 6 is a block diagram of an adaptor card of the FIG. 3 switch.

An example of an Adapter card 32 is shown in FIG. 6 which is intended to interface five external low-speed ports A to E to one switch core port. Only the port A components are shown for reasons of clarity. The adaptor card 22 comprises the following elements:

— a respective physical layer/framer unit 40 for each port A to E. The units 40 carry out the header error check functions mentioned above.

— a small (two cell) input FIFO 41 for the input side of each port A to E; these FIFOs help to match the rates of the input ports to the switch core port.

— a respective unit 42 for detecting when the contents of a corresponding one of the input FIFOs 41 falls below an amount equal to one cell.

— a small output FIFO 43 for the outside side of each port A to E; these FIFOs help to match the rate of the switch core port to that of the output ports.

— a respective unit 44 for detecting when the contents of a corresponding one of the output FIFOs 43 exceeds an amount corresponding to one cell.

— a Time Division Multiplexer 45 which multiplexes cells from each of the input ports into a switch core input port 37. Cells are sent cyclically in a predetermined port order (discussed below) that is held in an input port rota unit 46; the start of the port rota cycle is dictated by the global synchronisation signal.

— a Time Division Demultiplexer 47 which takes cells from the corresponding switch core output port 38 and sends them to the appropriate output port A to E. Cells arrive in a predetermined order that is held in a programmable output port rota unit 48 that is synchronised to the global synchronisation signal.

— a local clock unit 26.

Due to the close functional association of the multiplexer 45 and demultiplexer 47 on the one hand, and the associated switch core port on the other, the multiplexer 45 and demultiplexer 47 are clocked by clocking signals supplied from the switch core port to provide synchronised transfer of cells to/from the switch-core fabric 30.

The switch core port is run at a speed slightly greater than the cumulative speeds of the external ports associated with it (the output side of these latter ports being clocked from the local clock unit 26 which is set accordingly). One reason for doing this is to accommodate variation in the actual speed of the links connected to the external ports from their nominal values. This overrunning of the switch core port means that the input FIFOs 41 are being emptied faster than they are being filled. To deal with this, whenever the contents of one of the FIFOs 41 fall below an amount corresponding to one cell, the associated unit 42 signals the multiplexer 45 causing an empty-cell insertion unit 49 to generate and send an empty cell to the controller 33 in the appropriate time slot; this allows the input FIFO to fill again.

Conversely, the output FIFOs 43 are being filled faster than they can be emptied. This is handled by the appropriate unit 44 on detecting that the contents of its associated output FIFO 43 is more than one cell, providing a corresponding indication to the controller 33. If this indication is present upon the controller 33 preparing to send a cell to the corresponding external port, then the controller will send an empty cell instead to the external port. A unit 50 of the demultiplexer 47 is arranged to detect and delete this empty cell, allowing the FIFO 43 to drain.

Figure 7:
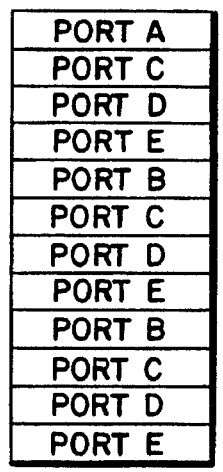
— FIG. 7 is a table depicting a service rota for the external switch ports of the FIG. 6 adaptor card.
Figure 7:

Considering next the order of servicing of the external ports as established by the port rotas stored in units 46 and 48, clearly the higher speed ports will need servicing more frequently than the lower speed ones. In general terms, the cell period of the lowest speed port sets the overall cycle time of the port rota, this lowest speed port only needing to be serviced once during the cycle whilst the higher speed ports will need servicing two or more times. FIG. 7 illustrates a possible port rota for the FIG. 6 adaptor card. During each cell period T of the associated switch core port, one cell is transferred to/from the switch core port from/to the external port A to D next on the port rota.

Processor

The processor unit 24 performs virtual channel connection setup and management, by receiving requests for connections and manipulating data structures in the controller 33. The processor also initialises controller data structures at power up.

To accomplish these functions the processor unit 24 has two interfaces to the switch core. The first is a cell interface through the processor input and output ports of the switch fabric; this allows the processor to send and receive cells, just as it would be able to do were it attached to one of the input/output ports on an adapter card.

The second interface is directly with the controller itself (see FIG. 4) to allow the processor to access internal data structures in the controller, so that it can set up and modify virtual channel data. The processor accesses the controller while the controller is idle because an empty cell has been received. To ensure that sufficient empty cells are received, the switch core is run slightly faster (about 10%) than the rate needed to cope with the input and output ports with the result that the adapter card FIFOs 41 periodically drain below their one-cell thresholds, causing the empty cell insertion units 49 to operate.

Although the processor has full access to all the data structures in the controller, it does not have any access to the shared cell body memory.

The general operation of the processor unit 24 in effecting initialisation and connection set up is in accordance with known practices in the art and will not therefore be further described.

The Fabric

Having described the general form of the switch, a more detailed description will now be given of the switch core fabric 30.

As already described, the fabric 30 connects to each adaptor card by one switch-core input port and one switch-core output port (hereinafter, a reference to a "port" should be taken to be a reference to a switch-core port unless otherwise stated). The fabric 30 also connects to the shared cell body memory 31 and basically serves as a time division multiplexer/demultiplexer which divides the bandwidth of the shared cell body memory between the ports.

Each input/output port 37, 38 is W lines wide and cells are transferred to/from the fabric by a succession of bit shifts effected in parallel on all lines of a port. If W=16, then two shifts are needed to transfer the header of a cell (at this stage, only 4 bytes long as the HEC byte is dealt with on the adaptor card), and twenty-four shifts are needed to transfer the 48-byte cell body. Again, if the data rate of the ports is fixed at 622 Mb/s, then with W=16, the port lines must run at about 40 MHz.

The operation of the fabric is best understood by considering first its operation in relation to a single pair of port lines, these being corresponding lines taken from a pair of associated input and output ports 37, 38.

Figure 8:
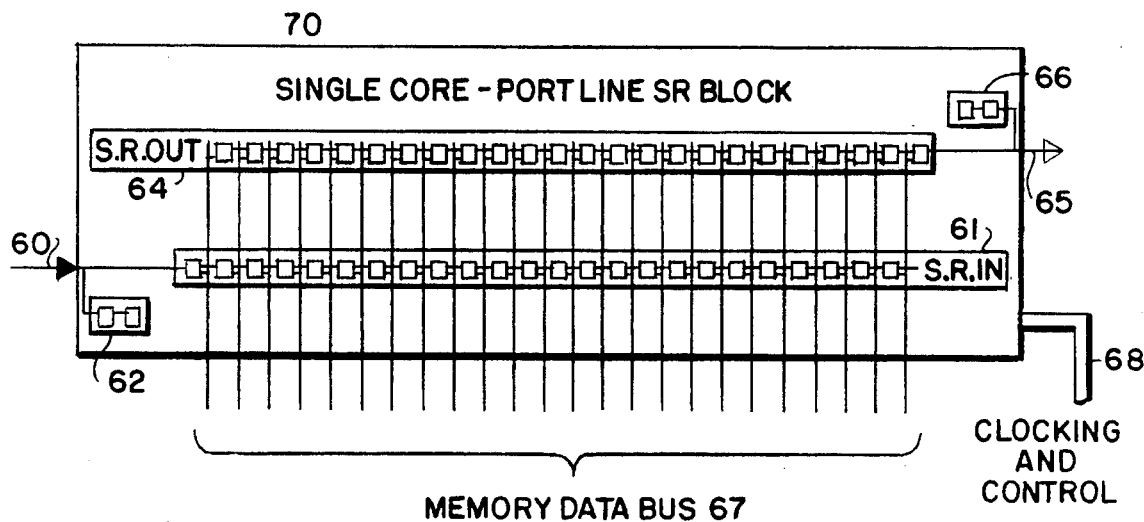
— FIG. 8 is a diagram of a single core-port line SR block of a switch fabric of the FIG. 4 switch core.

Referring to FIG. 8, a line 60 of an input port feeds a main input shift register 61 that has 488/W elements (488 being the number of bits in a 48-byte cell body); in the illustrated example, there are twenty four elements as would be the case for W=16. An input header shift register 62 is also connected to the line 60; this header comprises 32/W elements (that is, two elements for W=16).

A main output shift register 64 of 24 elements (488/w where W=16) feeds a line 65 of an output port, this output port being the one paired with the input port including line 60. The lines 60 and 65 are corresponding lines in the sense that in the distribution of bits of a cell body across the W lines of a port, the lines occupy the same position. An output header shift register 66 is also provided that is 2 elements long (32/ where W=16).

The shift register 61 is connected for parallel transfer from all its elements onto a memory data bus 67. The shift register 64 is connected for parallel transfer from the memory data bus 67 to all its elements. The connection of the registers 61 and 68 is selectively controllable such that only one register at a time is connected to the bus 67.

The shift registers 61, 62, 64 and 66 and the associated portion of the memory bus 67 form a single core-port line shift register (SR) block 70 for transferring onto the memory bus the cell body bits received on one input line 60, and for transfering corresponding bits from the memory bus onto one output line 65. In operation, as a cell is shifted in through the input port containing line 60, first two header bits will be shifted from line 60 into the header shift register 62 following which 24 cell-body bits will be shifted from line 60 into the input shift register 61. When the register 61 is full, its contents are transferred by a parallel transfer onto the memory data bus 64 and thereafter the transfer cycle for the input port repeats. With regard to the transferring out of the header shift register 62, this is done over lines not shown in FIG. 8 and is effected during the time that the register 61 is being filled. The operation of the output shift register 64 and 66 is the reverse of the input registers, the register 64 being parallel loaded from the memory data bus 67 and then having its contents shifted out onto line 65 after the contents of the header shift register 66 have first been shifted onto the line. There is no inherent requirement to synchronise the operation of the input and output lines of the block 70 except, of course, that the transfers to and from the bus 67 must not collide.

Associated with the single core-port line SR block 70 are various clocking and control signals for clocking the shift registers and initiating the parallel transfers to/from the bus 67. These signals are supplied over a clocking and control bus 68 and appropriate implementations will be apparent to persons skilled in the art.

The switch fabric 30 is effectively composed of a plurality of single core-port line SR blocks 70, the number of such blocks required being the number of ports N multiplied by the number of lines W in each port (in this context, the number of ports referred to is the number of full switch core ports made up of an input port and a corresponding output port). Consideration will now be given as to how these blocks 70 are arranged. At first sight, it might appear that a whole range of solutions are possible, from having all blocks 70 connected to the same memory data bus, to having each block 70 connected to a respective memory data bus (in this latter case, the shared cell body memory would have a width equal to the number of blocks NW multiplied by the number of elements in each main shift register). However, a number of considerations serve to constrain the range of possible arrangements.

Figure 9:
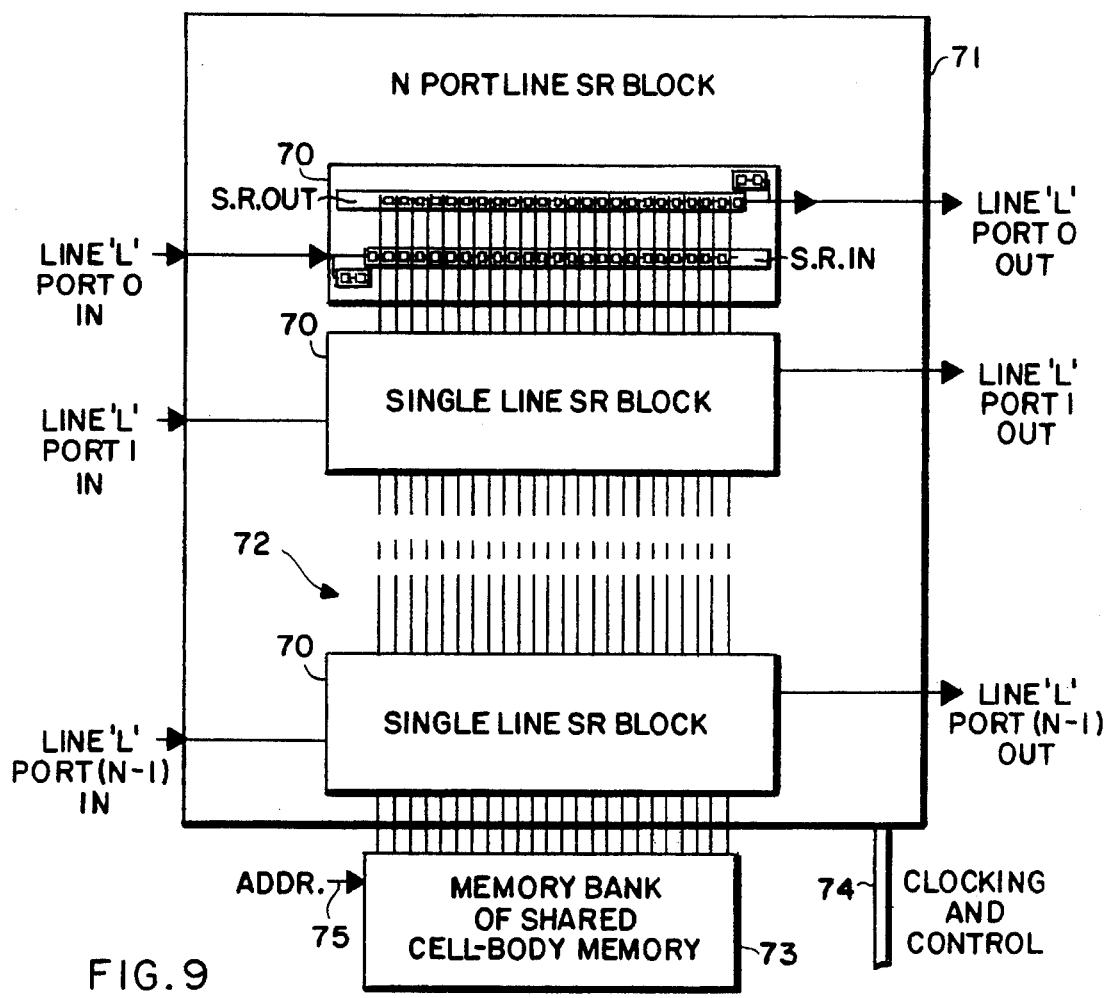
— FIG. 9 is a diagram of an N-port line SR block made up of FIG. 8 blocks.

In particular, if all input ports are to be able to communicate with all output ports, then each set of port lines made up of the corresponding line taken from each input and output port, must be associated with the same memory data bus. Thus, for example, the first line of each of the N input and output ports must be associated with the same bus. This is achieved by providing N blocks 70 interfacing with the same memory data bus as is illustrated in FIG. 9. Such an arrangement of N blocks 70 is hereinafter referred to as an N-port lines SR block 71, this block 71 being capable of dealing with the general line "l" of all N ports (these ports being numbered 0 to N−1 in FIG. 9).

In FIG. 9, the N-port line SR block 71 is shown as interfacing with a memory data bus 72 that connects to a memory bank 73 of the shared cell body memory. Again, clocking and control signals are provided over a corresponding bus 74. These clockings and control signals ensure, iner alia, that the parallel transfers to/from the shift registers 61 and 64 of each block 70 occur in a predetermined order, transferring cell-body bits on and off the bus 72 for writing to/reading from the memory bank 73 at an address provided over line 75 by the switch core controller 33.

Although not shown in FIG. 9, the header shift registers 62 and 66 of each block 70 also connect with appropriate lines for input to/output from the controller 33 as generally illustrated in FIG. 4.

Devising suitable arrangements for the switch fabric is now a matter of arranging W N-port line SR blocks 71 appropriately. Preferably, the number of memory data buses and associated memory banks is minimised by associating as many as possible blocks 71 with a memory data bus. However, a number of practical considerations limits the number of blocks 71 that can be associated with each memory data bus. In particular, there will be a limit on the number of transfers to/from the shared cell body memory that can be effected in the cell period T (that is, the time between the start of each cell arriving/leaving an input/output port). If Q memory transfers are possible in the cell period T, then since 2 N transfers are associated with each block 71, the number of blocks that can be associated with each memory data bus and memory bank is the integer part B of the division Q/2N. Once the value of B has been determined, then the provision of the necessary number W of blocks 71 is achieved by providing W/B memory data buses and memory banks.

Figure 10:
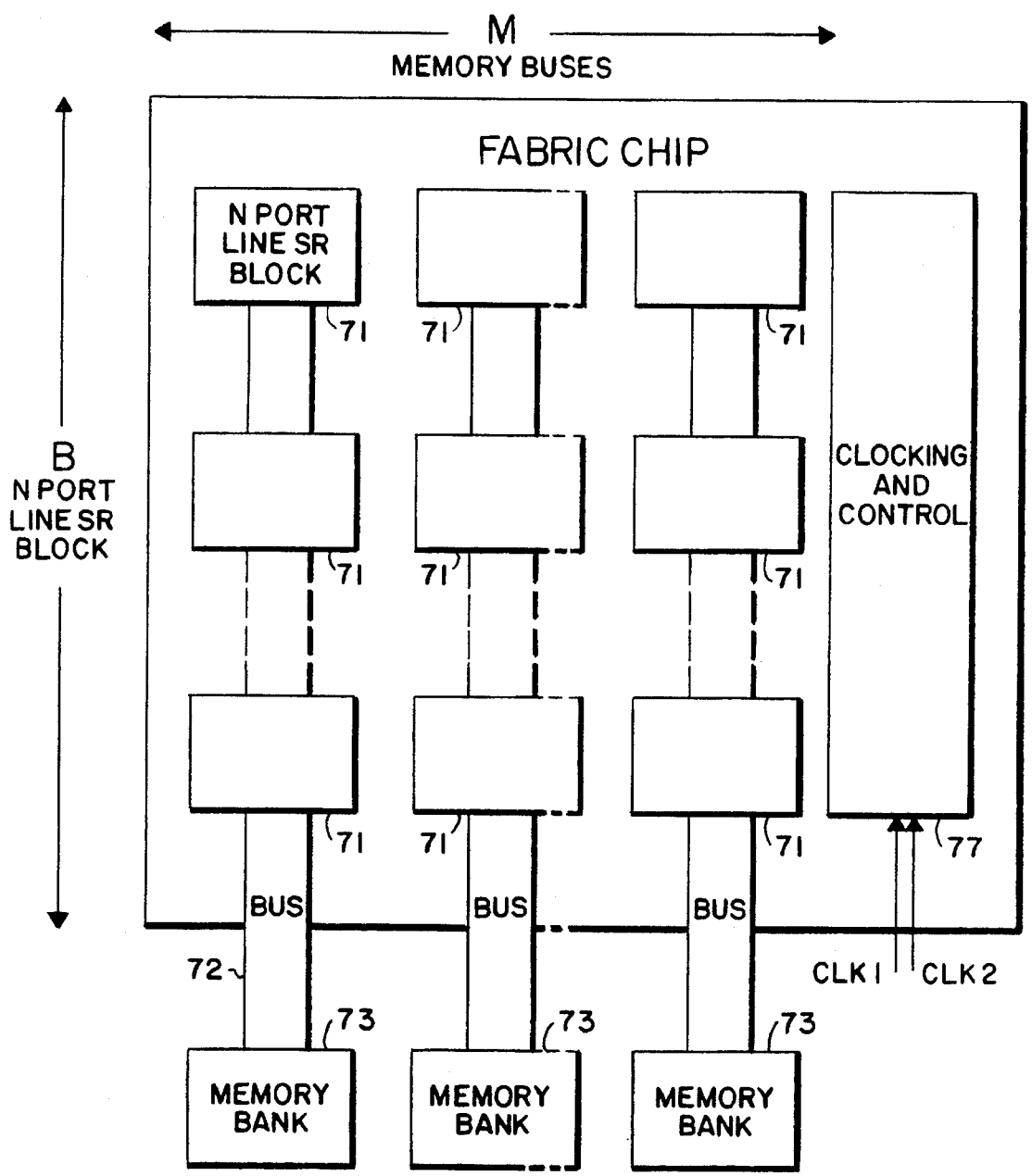
— FIG. 10 is a diagram of a switch fabric chip made up of FIG. 9 blocks.

Of course, as a practical matter, the switch fabric is best implemented in integrated circuit form as a number of similar chips. Each such chip will contain M memory buses each with B associated N-port SR line blocks 71 as is illustrated in FIG. 10. Generally, the limit on the value M will be determined by the number of pins available on the chip and typically M will have a value of 2. The number of chips required to implement a switch fabric with N ports each of W lines is then W/BM.

Each chip will also contain clocking and control circuitry 77 provided with one or two external clock signals CLK1 and CLK2. One clock signal is used to clock the shift registers in each block 71 whilst the other clock signal (which could be derived from the first) is used to time the transfers onto the memory data buses. The clocking and control circuit 77 controls when each of the shift registers 61 and 64 effects its parallel transfer of bits to/from the associated memory data bus. It will be apparent that the timing of these transfers must be such that none of the shift registers associated with the same memory data bus tries to carry out a transfer at the same time as another shift register associated with the same bus. The clocking and control circuit 77 therefore ensures a predetermined rota of bus transfers for the shift registers associated with the same memory data bus. In fact, the clocking and control circuits of the chip making up the switch fabric are coordinated and arranged such that the bus transfers associated with any one input port or output port occur generally at the same time (that is, successively where blocks 71 are on the same memory data bus, and in parallel as between blocks on different buses). One reason to have all lines associated with the same input or output port transferring at generally the same time is that the timing of the bit shifting for each line of the port can then be made the same, that is, the start of a transfer of a new cell is the same for all lines of the port. Another reason to have all lines of a port transferring as closely as possible is that if more than one transfer is required, then different ports of the same cell body will be stored at different memory address (at each transfer, a new address must, of course, be provided by the controller 33 to memory banks); it is convenient to have such different parts of the same cell body stored at successive memory locations and the simplest way to produce the required addresses is to be able to increment a base address provided for the transfer of a first part of the cell body, to handle subsequent transfers of the remaining parts of the same cell body.

There are two possible approaches for ensuring that the parallel transfers associated with lines of the same port are effected at generally the same time. First of all, the clocking and control circuit 77 of each chip could be made such that it was possible to program into the circuit the order in which the shift registers 61 and 64 on each memory bus were activated for parallel transfer, this order being synchronised between the buses; with this arrangement, it would not matter to which shift register 61/64 an input/output port line was connected as appropriate adjustment could be made for this by programming the circuit 77. The alternative approach would be to have a fixed transfer rota operated by the circuit 77 and then to ensure that the connection of the input/output port lines to the shift registers was such that the transfer associated with the lines of the same port are carried out at the same time.

Having discussed in general terms the form of the switch fabric and of the switch fabric chips, a specific example will be given for a four-port fabric (N=4) where each input/output port is sixteen lines wide (W=16, L=24). In this case, each N-port line SR block 71 will comprise four single core-port line SR blocks 70. If, say, up to 20 memory transfers are possible each cell period T, then two N-port line SR blocks 71 can be arranged on the same memory bus (B=2). With L=24, a typical value for the number of memory buses that can be provided on a chip is two (M=2) and this gives rise to a form of chip such as shown in FIG. 11 (the clocking and controls circuit 77 of the chip being omitted for clarity).

As can been seen, each chip comprises four blocks 71 and therefore deals with four lines from all of the input/output ports. As there are 16 lines per port, 4 fabric chips will be needed.

Figures 11, 13:
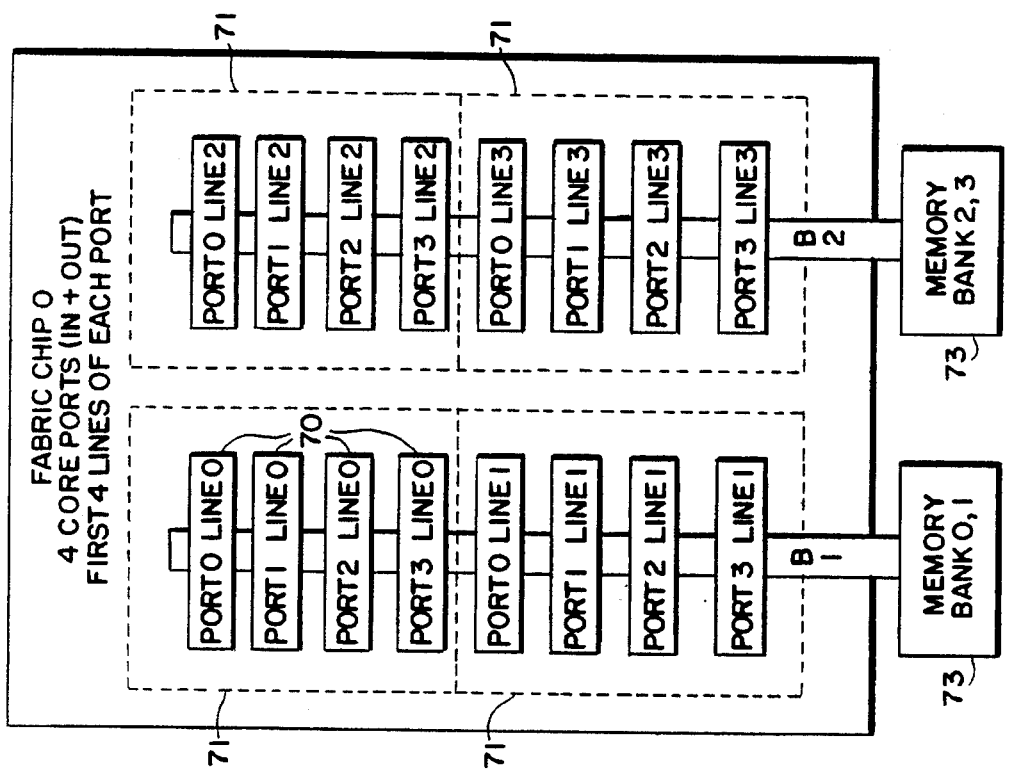
— FIG. 11 is a diagram of a switch fabric chip having two memory buses and eight FIG. 8 blocks per bus, showing the effective division of the FIG. 8 blocks into FIG. 9 blocks in the case of a four port switch core.
— FIG. 13 is a table illustrating, for the FIG. 12 arrangement, the transfers involved for transfers a cell body received through one switch core port onto the memory data buses of a cell-body memory of the switch core.

The fabric chip shown in FIG. 11 is labelled fabric chip "0" as the chip deals with the first four lines on each port, that is lines 0 to 3. The association between each single core-port line SR block 70 and the port and line that it serves is indicated in FIG. 11, the blocks 71 being shown in dotted outline. The N-port line SR blocks 71 handling lines 0 and 1 are connected to bus B1 that, in turn, is connected with a memory bank labelled "memory bank 0, 1" to indicate that the memory bank stores the bits associates with lines 0 and 1. Similarly, the blocks 71 associated with lines 2 and 3 connect to a memory bus B2 which, in turn, connects to a memory bank 2, 3.

It will appreciated that the disposition of the blocks 70 in FIG. 11 has been chosen to facilitate an understanding of their functional inter-relationship rather than necessarily indicating the actual layout of these blocks in the chip.

Figure 12:
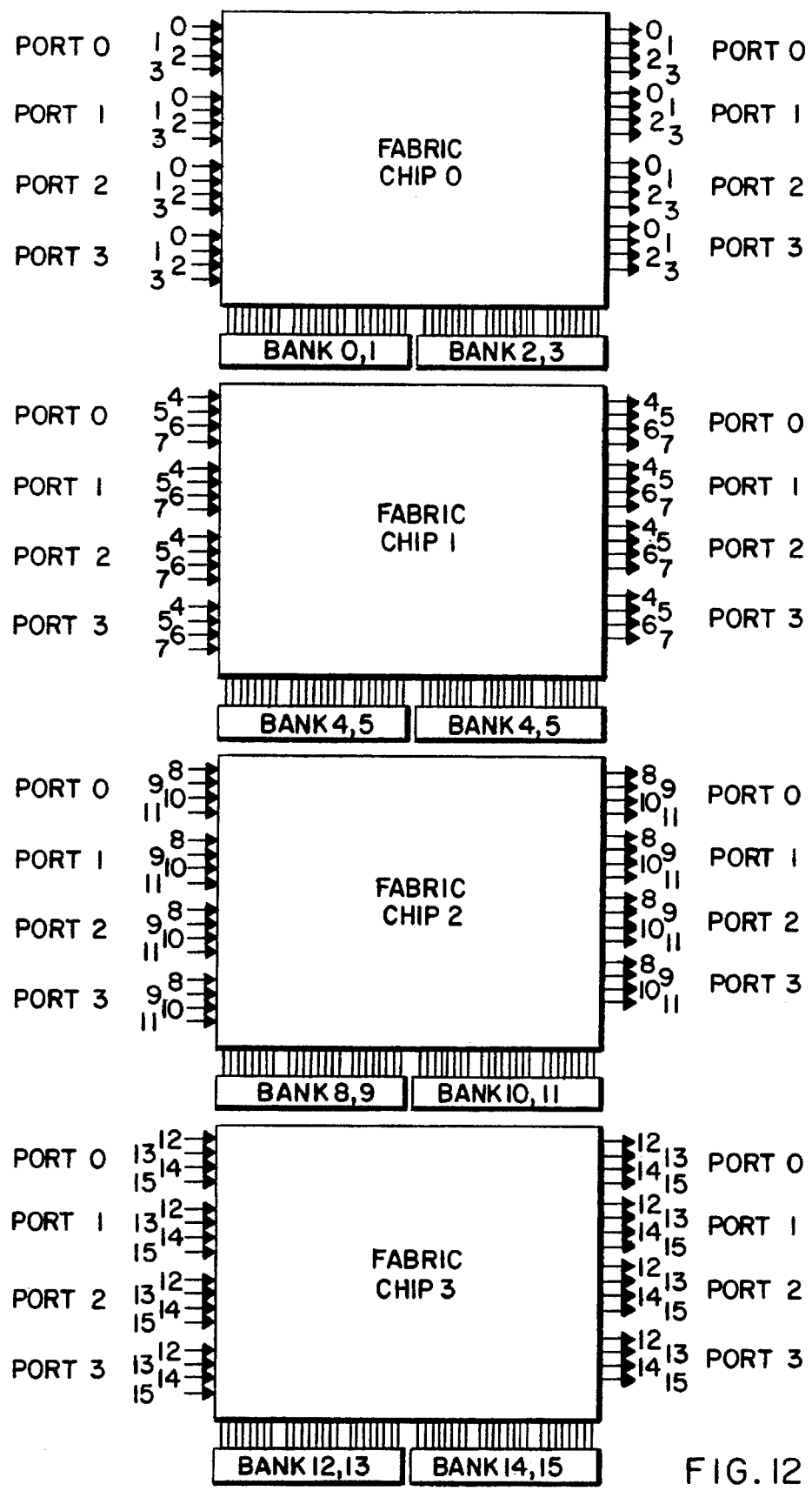
— FIG. 12 shows four FIG. 11 chips used to form the switch fabric of a four port switch core.

FIG. 12 illustrates all four fabric chips 0 to 3 showing the disposition of port lines between the chips and the provision of light memory banks 73, 2 per chip. For reasons of clarity, FIG. 12 does not show all the pins of each chip, in particular, the pins for dealing with the header bits and for the clocking and control circuits are not shown.

FIG. 13 is a table showing for one port (input port 0) the schedule for transferring the cell-body bits shifted into the shift registers associated with each of the 16 lines 0 to 15 of the port, onto the memory buses of the chips. The transfers associated with the lines of input port 0 all occur during a first and a second transfer period—as will be more fully explained hereinafter, there are 18 such transfer periods in each cell period T. During transfer period 1, the bits associated with line 0 are transferred onto the bus 1 of the chip 0 whilst the bits associated with line 2 are transferred onto bus 2 of chip 0. Similarly, the bits associated with lines 4 and 6 are transferred onto buses 1 and 2 of chip 1, the bits associated with lines 8 and 10 are transferred onto buses 1 and 2 of chip 2, and the bits associated with lines 12 and 14 are transferred onto buses 1 and 2 of chip 3. In the second transfer period, the bits associated with lines 1 and 2, 3 and 5, 9 and 11, 13 and 15 are transferred onto buses 1 and 2 of chips 0 to 3, respectively. Thus, after the first two transfer periods, input port 0 has had all the cell body bits transferred from its shift registers into the shared cell body memory. This leads the remaining 16 transfer periods present in the cell period T for the shifting in on each port line of 24 bits and to this end, the port lines and shift registers are clocked at 1.5 times the clocking rate of the parallel transfers onto the memory buses.

Figure 14:
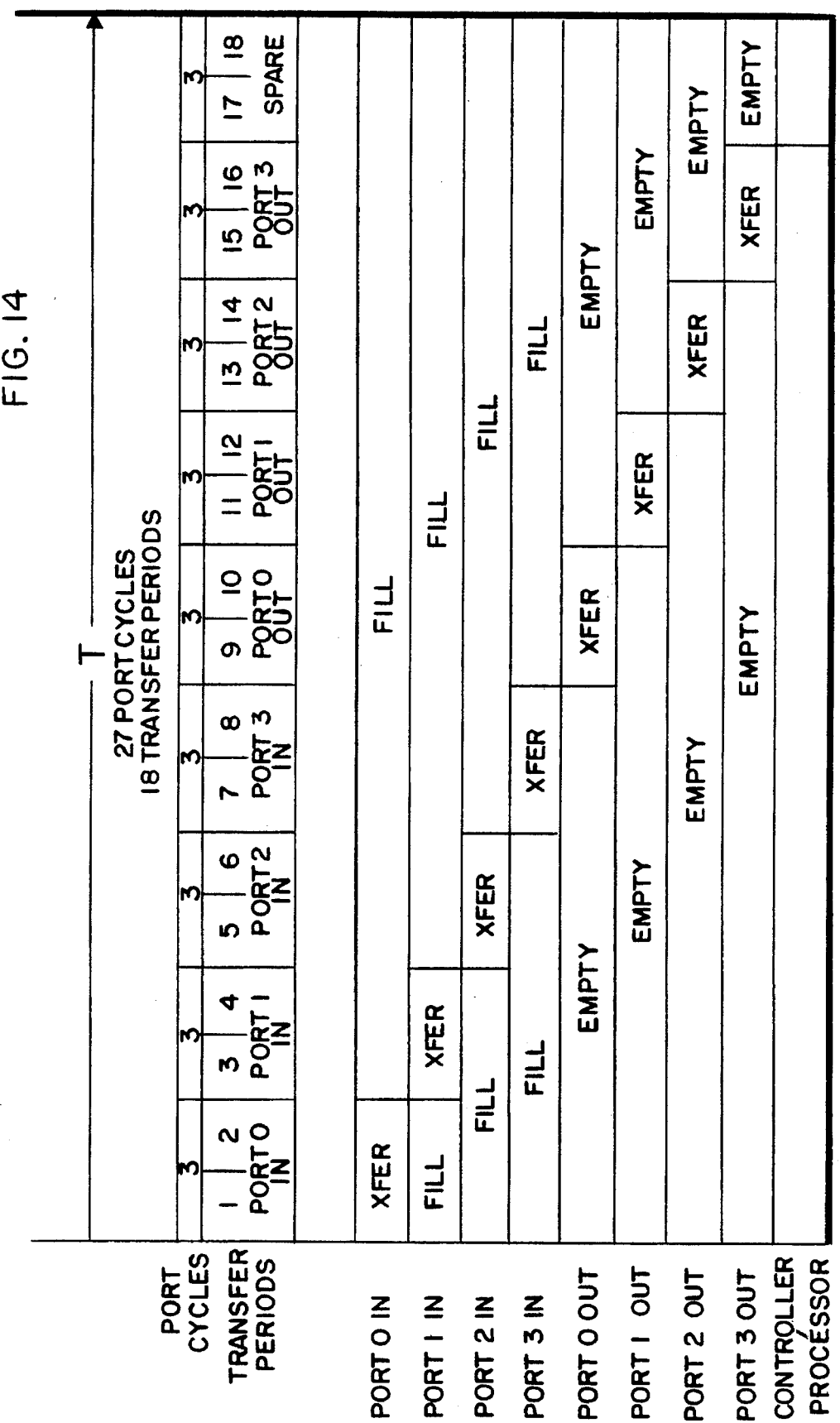
— FIG. 14 is a diagram showing the timing of a cycle of port transfers for the Figure arrangement.

This is illustrated in FIG. 14 which shows that in one cell period T, there are 27 port cycles (clock cycles for the line and shift registers, and 18 transfer periods. As can be seen in FIG. 14 and as already been described in relation to FIG. 13, during transfer periods 1 and 2, the input port 0 has its cell body bits transferred into the shared cell body memory; for transfer periods 3 to 18 (16 transfer periods equaling 24 port cycles), the shift registers associated with input port 0 are filled.

The timing of transfers in relation to the other input and output ports are also shown in FIG. 14. Thus, for example, output port 0 has data transferred into its shift registers from the memory data buses during periods 9 and 10, these shift registers being emptied through the port during transfer periods 11 to 18, 1 to 7.

The foregoing description has only dealt with the main switch-core ports. However, of course, the switch fabric has two lower speed ports, these being the controller port and the processor port. Generally, it will be possible to fit in the transfers for these lower rate ports in redundant portion of the overall transfer rota. Thus, with reference to FIG. 14, transfer periods 17 and 18 are free each cycle to deal with the lower rate port transfers; as 2 transfer transfer periods are available, it will be possible for the controller port and the processor port to effect transfers in alternate cell periods T (although such a rate may not be required in practice). As regards the shift register structure used for the controller and processor ports, this will depend on the number of lines of these ports; however, because they are of lower overall speed, the number of lines for these ports can be reduced. Thus, for example, in relation to the example of FIGS. 11 to 14, each of the processor and controller port could comprise 8 lines and each of the chips could be provided with 2 blocks similar to the blocks 70 but with main shift registers of 48 elements, each of these shift registers spanning the 2 memory buses of the corresponding chip. Such an arrangement is possible because, of course, the controller and processor ports have twice as long to shift in data.

The above description of the structure and operation of each chip has assumed that:

(a) each of the input and output shift registers 61 and 64 of each single core-port line-SR block 70 is clocked for twenty four port cycles (sixteen transfer periods) to shift in/out bits serially, after which shifting is stopped for three port cycles (two transfer periods) and the register contents are transferred in parallel onto the memory bus; and (b) the start of cell shifting through each input and output port is staggered.

In fact, it is preferable to have all the shift register 61 and 64 operating continuously to shift in/out bits, and also to have all adaptor cards start the transfer of a new cell at the same time.

So far as having the registers 61 and 64 continuously shifting is concerned, this can be achieved by timing the parallel transfer of bits from each register onto the corresponding memory bus, to occur when the register is exactly full with cell body bits. It also means that as there are twenty seven port cycles per cell period T but only twenty four cell body bits to be shifted in/out of each register, an extra three bits must be shifted in/out with the cell body bits. For the input registers 61, these extra three bits are the two cell header bits passed on the same line, and a dummy bit; these three bits are simply shifted through the input register and lost (the header bits having been previously shifted into the register 62). For the output registers 64, the extra three bits are again composed of two header bits (from register 66, these bits overwriting "don't care" bits shifted out of register 64) and a dummy bit shifted out of register 64 and subsequently removed in the corresponding adaptor card.

In order to permit the adaptor cards all to start cell transfer at the same time, whilst providing for the staggering of parallel transfers from the registers 61, 64 to/from the same memory bus, it is possible to arrange for the insertion of delay shift registers of progressively greater value in each of the lines connecting to registers 61, 64 associated with the same bus; In this way, the times at which input the registers are ready for parallel transfer with the associated memory bus can be made to differ as desired.

Figure 15:
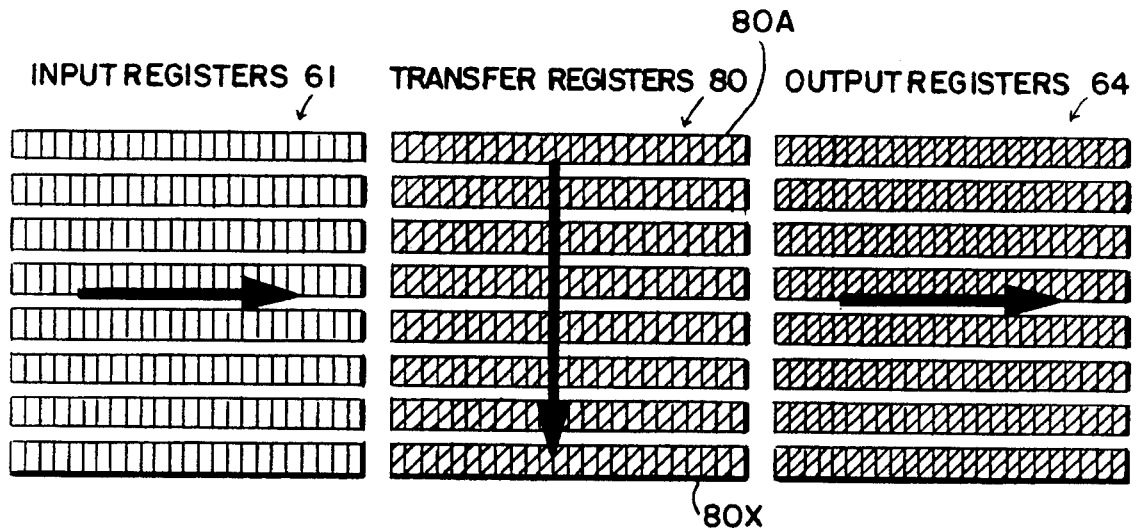
— FIG. 15 is a diagram illustrating the operation of a preferred form of parallel transfer means for transferring data from the FIG. 8 blocks of the FIG. 11 chip to the corresponding memory bus, the state of the transfer means shown at the start of a cell period.
Figure 16:
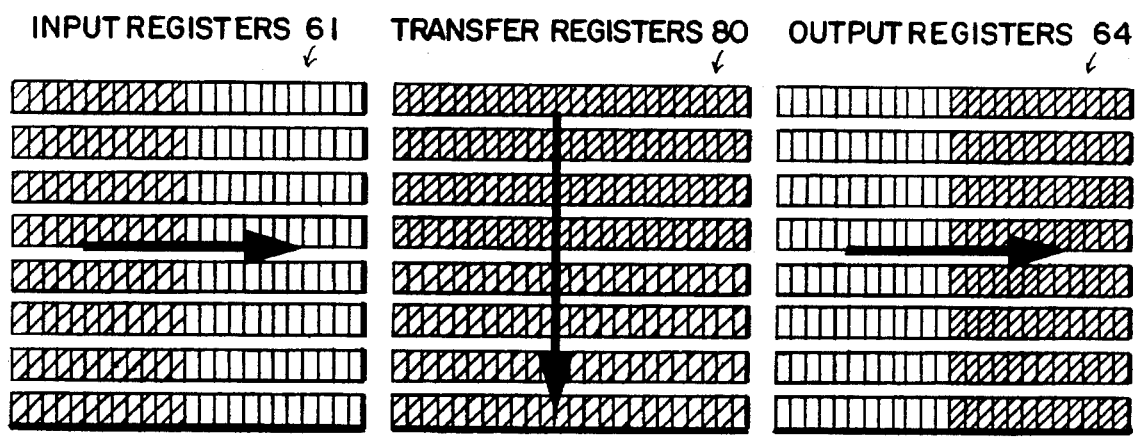
— FIG. 16 is a diagram similar to FIG. 15 but shown half way through a cell period.
Figure 17:
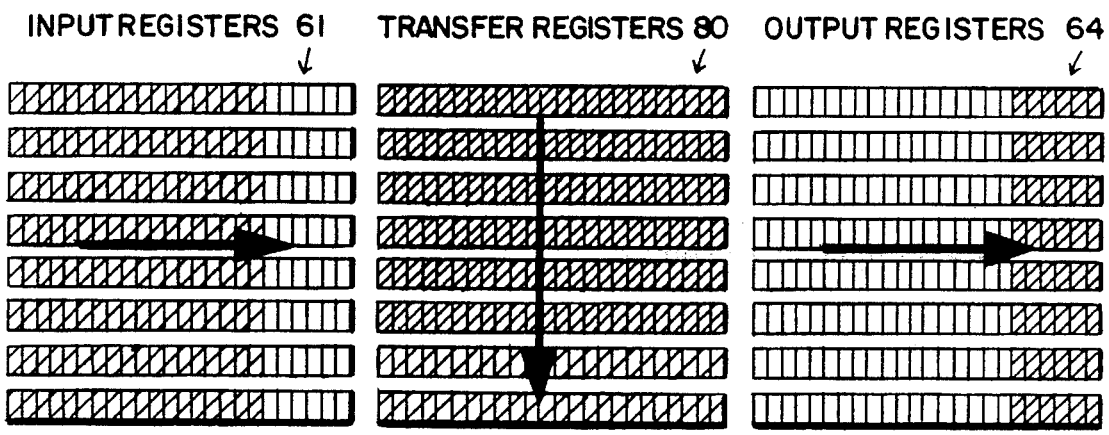
— FIG. 17 is a diagram similar to FIG. 15 but shown three-quarters of the way through a cell period.
Figure 18:
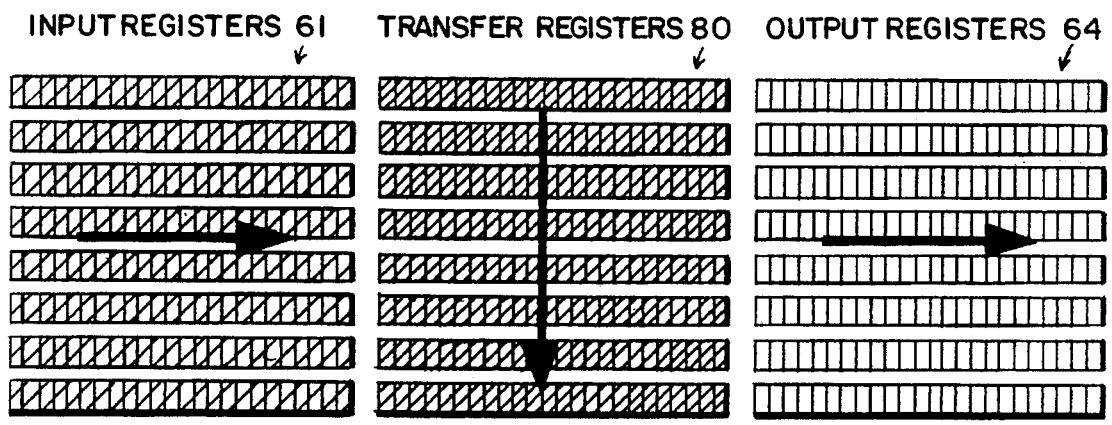
— FIG. 18 is a diagram similar to FIG. 15 but shown near the end of a cell period.
Figure 19:
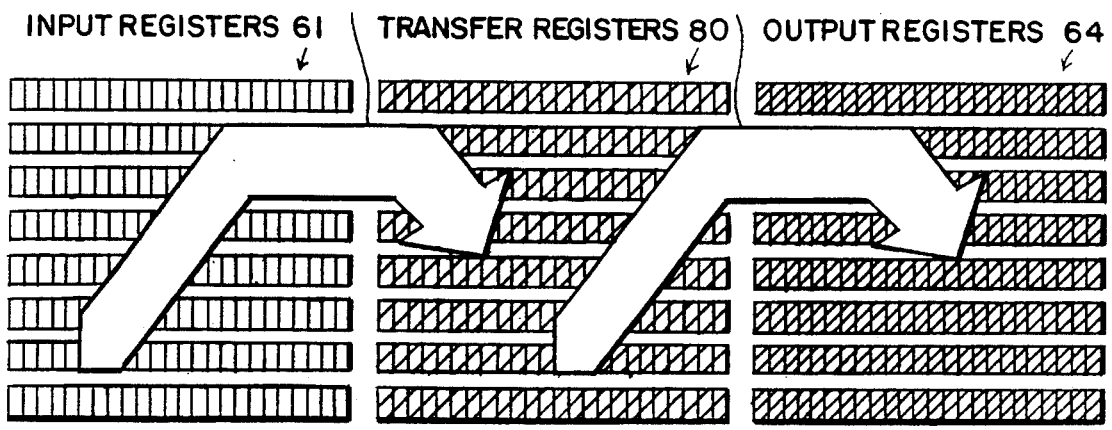
— FIG. 19 is a diagram similar to FIG. 15 but shown at the end of a cell period.

In fact, rather than providing these delaying shift registers in series with the registers 61, 64, it is preferred to permit the adaptor cards all to start cell transfer at the same time, by providing a buffering parallel-transfer register for each pair of registers 61, 64 and then to have these latter effect their parallel transfers to and from the memory bus through this buffering register rather than directly. More particularly, and with reference to FIG. 15, for each single core port line-SR block 70, a respective parallel-transfer register 80 is provided (with the same number of elements as the registers 61, 64), this register being arranged to effect parallel transfers from the register 61 and to register 64. Additionally, all registers 80 associated with blocks 70 on the same memory bus are connected in a cascade arrangement for parallel transfer of their contents from a first one 80A of the registers 80 to a last one 80X. The first register 80A is selectively connectable to the memory bus for the parallel transfer of data therefrom, whilst the last register 80X in the cascade arrangement is selectively connectable to the memory bus for the parallel transfer of data thereto.

The functioning of this cascade arrangement of registers 80 will now be described with reference to FIGS. 15 to 19 that show the state of the registers 61, 64 and 80 for one memory bus with eight blocks 70. Input and output data are depicted in these Figures by different shadings in the registers concerned.

At the beginning of a new cell period (T=0, FIG. 15), the input registers 61 are all empty, the registers 80 are full of input data (each register 80 having just received the contents of its associated register 61), and the registers 64 are full of output data transferred from the registers 80. The heavy arrows indicate the direction of shifting now to be undertaken in the register blocks:

— for registers 61, new input data is about to be shifted in over the input port lines (in fact, the first three bits will be "don't care" data—two header bits and a dummy bit);

— for the registers 80, the input data they hold is to be shifted by parallel transfers down the cascade arrangement and through the last register 80X onto the memory bus (not shown); at the same time, output data is to be transferred from the memory bus into the registers 80 through the first of the registers 80A;

— for the registers 64, output data is about to be shifted out over the output port lines.

At approximately T=0.5 (see FIG. 16), the registers 61 are half full of new input data, half of the registers 80 contain old input data and half contain new output data, and the registers 64 are half emptied of old output data.

At approximately T=0.75 (see FIG. 17), the registers 61 are three-quarters full of new input data, a quarter of the registers 80 contain old input data and three-quarters contain new output data, and the registers 61 are three-quarters emptied of the old output data.

At approximately T=0.99 (see FIG. 18), the registers 61 are full of new input data, the registers 80 are full of new output data, and the registers 64 are empty.

Immediately thereafter (T=1, FIG. 19), the contents of the registers 80 are transferred, by parallel transfer (arrow 81) to the corresponding registers 64, and the contents of the registers 61 are transferred by parallel transfer (arrow 82) to the corresponding registers 80.

The cycle of operation then repeats.

The registers 80 thus together form parallel transfer means through which the registers 61 and 64 transfer data to/from the memory bus. In fact, the selectively controllable connection of the registers 61 and 64 to the bus 67 in FIG. 8 may also be conceptually viewed as parallel transfer means for effecting the same function. The parallel transfer means described above with reference to FIG. 15 to 19 are, however, preferred.

Given the availability of chips of the FIG. 11 form (that is, with 2 memory buses each having 8 associated single core-port line SR blocks 70 and associated parallel transfer means, not separately shown), it is possible to use these chips for a variety of different switch fabric arrangements with the blocks 70 in each case forming different sizes of N-port line SR block 71.

Figure 20:
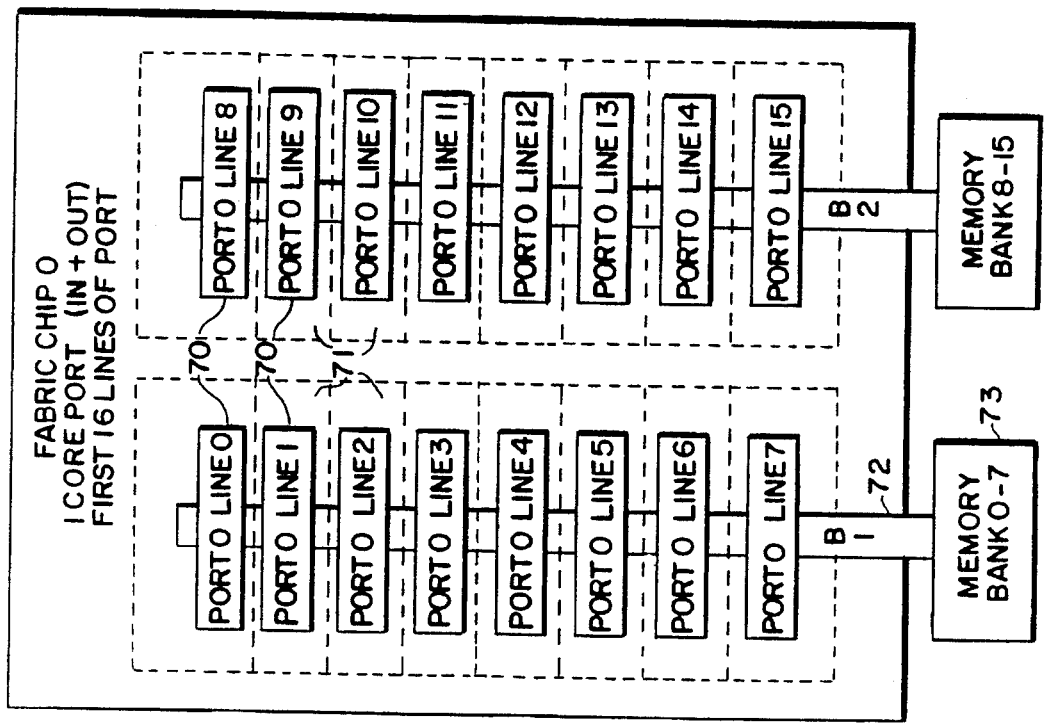
— FIG. 20 is a diagram similar to FIG. 11 but showing the effective division of the FIG. 8 blocks of the FIG. 11 chip, into FIG. 9 blocks in the case of a one port switch core.

Thus, for example, for a switch fabric having only a single core port made up of an input port/output port pair, each of the blocks 70 would directly constitute a block 71 so that assuming the input port and output port each had 16 lines, one chip would be sufficient to deal with the single port (see FIG. 20).

Figure 21:
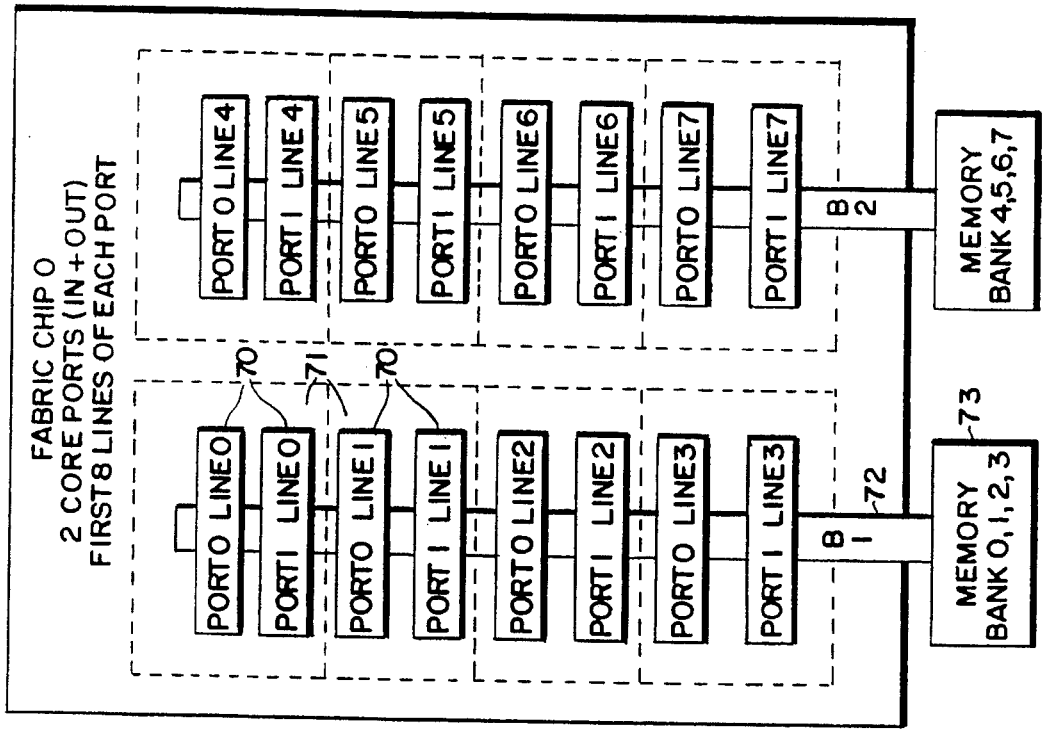
— FIG. 21 is a diagram similar to FIG. 11 but showing the effective division of the FIG. 8 blocks of the FIG. 11 chip, into FIG. 9 blocks in the case of a two port switch core.

FIG. 21 relates to a switch fabric having 2 core ports with W=16. Here, 2 blocks 70 are required to form an N-port line SR block 71 so that it is only possible to deal with 8 of the 16 lines of each port on one chip. FIG. 21 shows the fabric chip "O"' dealing with the first 8 lines of each port.

Figure 22:
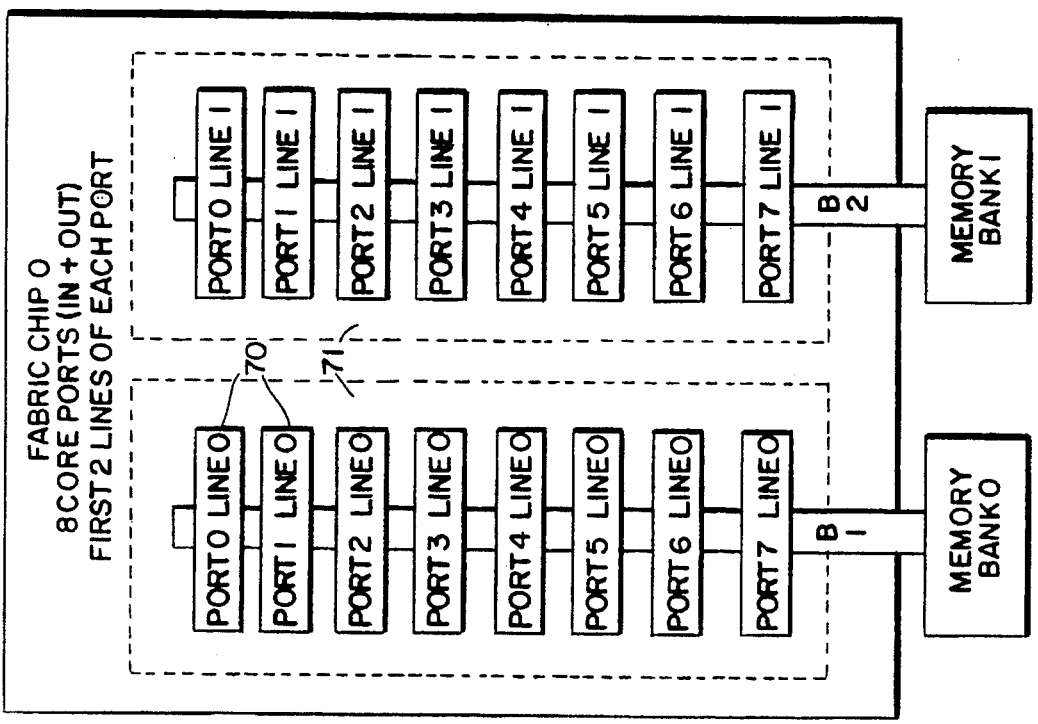
— FIG. 22 is a diagram similar to FIG. 11 but showing the effective division of the FIG. 8 blocks of the FIG. 11 chip, into FIG. 9 blocks in the case of an eight port switch core.

FIG. 22 relates to a switch fabric having 8 core ports (with W=16) so that 8 blocks 70 are required to form an N-port line SR block 71. In this case, only 2 lines from each port can be dealt with by a single chip so that 8 chips would be required in all.

Figure 23:
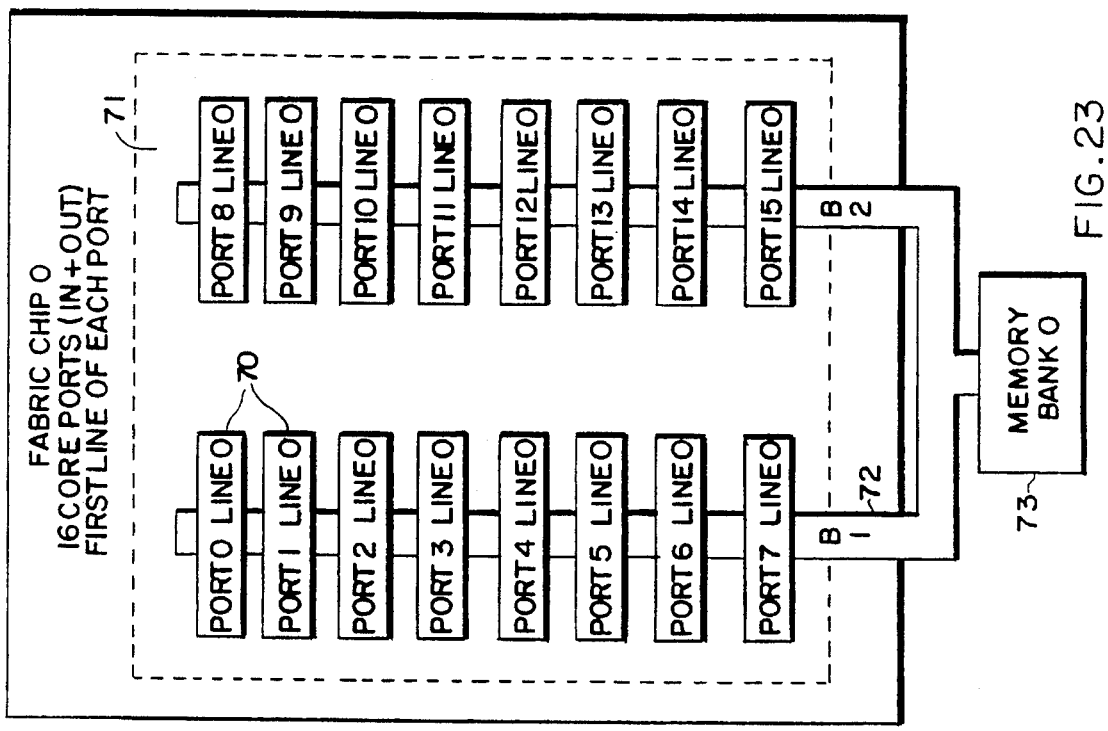
— FIG. 23 is a diagram similar to FIG. 11 but showing the effective division of the FIG. 8 blocks of the FIG. 11 chip, into FIG. 9 blocks in the case of a sixteen port switch core.

Finally, FIG. 23 relates to a fabric having 16 core ports (with W=16). In this case, it is possible to use a chip to deal with one line from each port because there are 16 blocks 70 in each and they together form one N-port line SR block 71. However, if the chip is used in this fashion, it is necessary to connect the buses B1 and B2 externally and only one memory bank need be provided. In addition, the clocking and control means of each chip must now ensure that all 16 blocks 70 are in a common transfer rota rather than running two parallel rotas for the two buses (in the other usages of the chip described above, the buses were separate and so could perform transfers in parallel).

Other connections arrangements for chips having 2 memory buses each with 8 blocks 70 can be envisaged additional to those described above; for example, arrangements can be devised for 3 and 5 port switch core fabrics though such arrangements will generally not make full usage of all the blocks 70 on each chip. It will be appreciated that chips with different numbers of memory buses and blocks 70 can similarly be used in a variety of arrangements; if S is the number of blocks 70 on a memory bus of a chip, then that memory bus will be able to cope with a number of port lines equal to the integer chip part of the result of the division S/N and each chip as a whole will be able to deal with M times as many lines.

We claim:

1. A chip for use in implementing a cell switch fabric intended to interface a cell body memory to N input ports and N output ports where each port has a plurality of lines over which constituent bits of a cell body can be transferred by a succession of bit shifts; said chip comprising M externally-accessible, separate memory buses each with an associated plurality S of single line-SR blocks, each said block comprising:

— an externally-accessible input contact,

— an input shift register of L elements, the input shift register being connected to said input contact to enable bits to be shifted into the input shift register, — an externally-accessible output contact, and — an output shift register of L elements, the elements of the output shift register being connected to the output contact to enable bits to be shifted out of the output shift register through said output contact, each said memory bus further having associated parallel transfer means operative for each said input shift register to transfer bits in parallel from the input shift register onto the memory bus and for each said output shift register to transfer bits in parallel from the memory bus into the output shift register, the chip further comprising clocking and control means connected to said single line-SR blocks and to said parallel transfer means for clocking and controlling the shifting and the parallel transfer of bits; said chip being usable in a plurality of different switch fabric arrangements to handle BM sets of said lines where B is the integer part of the result of the division S/N and where each set comprises all corresponding lines taken one from each of said N input and N output ports.

2. A chip according to claim 1, wherein said parallel transfer means comprises a respective parallel connection associated with each of said input and output shift registers, each said parallel connection serving to selectively connect the elements of the associated register in parallel to the corresponding said memory bus.

3. A chip according to claim 1, wherein said parallel transfer means comprises for each said block, a further register of L elements connected for the parallel transfer of bits from the input shift register into said further register and for the parallel transfer of bits from the further register to the output register, the further registers of all said blocks associated with the same memory bus being connected into a cascade arrangement for the parallel transfer of bits therethrough, the first of said further registers in said cascade arrangement being connected to receive bits in parallel from the memory bus and the last of said further registers in the cascade arrangement being connected for parallel transfer of bits onto the memory bus; said clocking and control means being arranged to cause:

— the transfer of bits from each input shift register associated with the memory bus into the corresponding further register and then the shifting of the contents of each further register through the cascade arrangement of further registers out onto the memory bus; and — the filling of the further registers with bits from the memory bus by successive parallel transfers from the bus into said first further register and the shifting of the contents of the latter through the cascade arrangement, the further registers when filled from the memory bus having their contents transferred in parallel to the corresponding output shift registers.

4. A chip according to claim 1, wherein:

M=2 S=8;

said chip being usable for switch fabric arrangements with 1, 2, 4 or 8 ports to handle 16, 8, 4, or 2 sets of lines.

5. A chip according to claim 1, wherein each said single line-SR block includes further shift register elements for header bits of a header associated with each said cell body.

6. A chip according to claim 1, wherein said clocking and control means includes means for specifying the order in which said shift registers of the chip are to effect said parallel transfers with the associated bus.

7. A chip according to claim 1, wherein said clocking and control means is such as to permit said shift registers to be clocked for bit shifting at a first clocking speed and to effect said parallel transfers at intervals determined by a second clocking speed.

8. A cell switch fabric for interfacing a cell body memory to N input ports and N output ports where each port has a plurality W of lines over which the constituent bits of a cell body can be transferred by a succession of L bit shifts, said switch fabric comprising C chips according to claim 1 where C is the nearest integer number equal to or greater than W/BM, the lines of each said set of lines being connected to respective single line SR-blocks associated with the same memory bus.

9. A cell switch fabric according to claim 8, wherein:

M=2 S=8 N=4;

each said chip being connected to deal with four said sets of lines.

10. A cell switch fabric according to claim 9, wherein:

W=16 L=24;

each said cell body being a 48 byte ATM cell body and the fabric comprising four said chips.

11. A cell switch fabric according to claim 8, wherein each of said C chips has two memory buses which buses are externally interconnected whereby to effectively produce one memory bus for the value of M, the value of S being effectively doubled thereby enabling the number of ports handled by the chip to be doubled at the expense of halving the number of said sets of lines that can be handled.

12. A cell switch fabric according to claim 8, wherein transfer control means are provided for causing the shift registers of a said chip that are connected to lines of the same said port, to effect said parallel transfers with the associated memory bus directly one after another.

13. A cell switch fabric according to claim 12, wherein said transfer control means is formed in part by said clocking and control means of each chip, said clocking and control means being arranging to control said shift registers to effect parallel transfers with the associated said bus according to a fixed rota, said transfer control means further comprising the connection arrangement of said lines to the input/output contacts of the chips, this connection arrangement being such that corresponding lines from said ports are connected to shift registers that follow one another in said rota.

14. A cell switch fabric according to claim 12, wherein said transfer control means is constituted by said clocking and control means of each chip, each said clocking and control means including means for specifying the order in which said shift registers of the chip are to effect said parallel transfers with the associated bus.

15. A cell switch fabric for interfacing a cell body memory to N input ports and N output ports where each port has a plurality W of lines over which the constituent bits of a cell body can be transferred by a succession of L bit shifts, said switch fabric comprising a plurality of chips each handling B sets of said lines where each set comprises all corresponding lines taken one from each of said N input and N output ports, there being W/B such chips in all; each said chip comprising M externally-accessible, separate memory buses each with an associated plurality BN/M of single line-SR blocks, each said block comprising:
 — an externally-accessible input contact,
 — an input shift register of L elements, the input shift register being connected to said input contact to enable bits to be shifted into the input shift register,
 — an externally-accessible output contact, and
 — an output shift register of L elements, the elements of the output shift register being connected to the output contact to enable bits to be shifted out of the output shift register through said output contact, each said memory bus further having associated parallel transfer means operative for each said input shift register to transfer bits in parallel from the input shift register onto the memory bus and for each said output shift register to transfer bits in parallel from the memory bus into the register, and the single line-SR blocks associated with each said memory bus handling B/M said sets of lines; the chip further comprising clocking and control means connected to said single line-SR blocks for clocking and controlling the shifting and parallel transfer of bits.

* * * * *